UNITED STATES PATENT OFFICE.

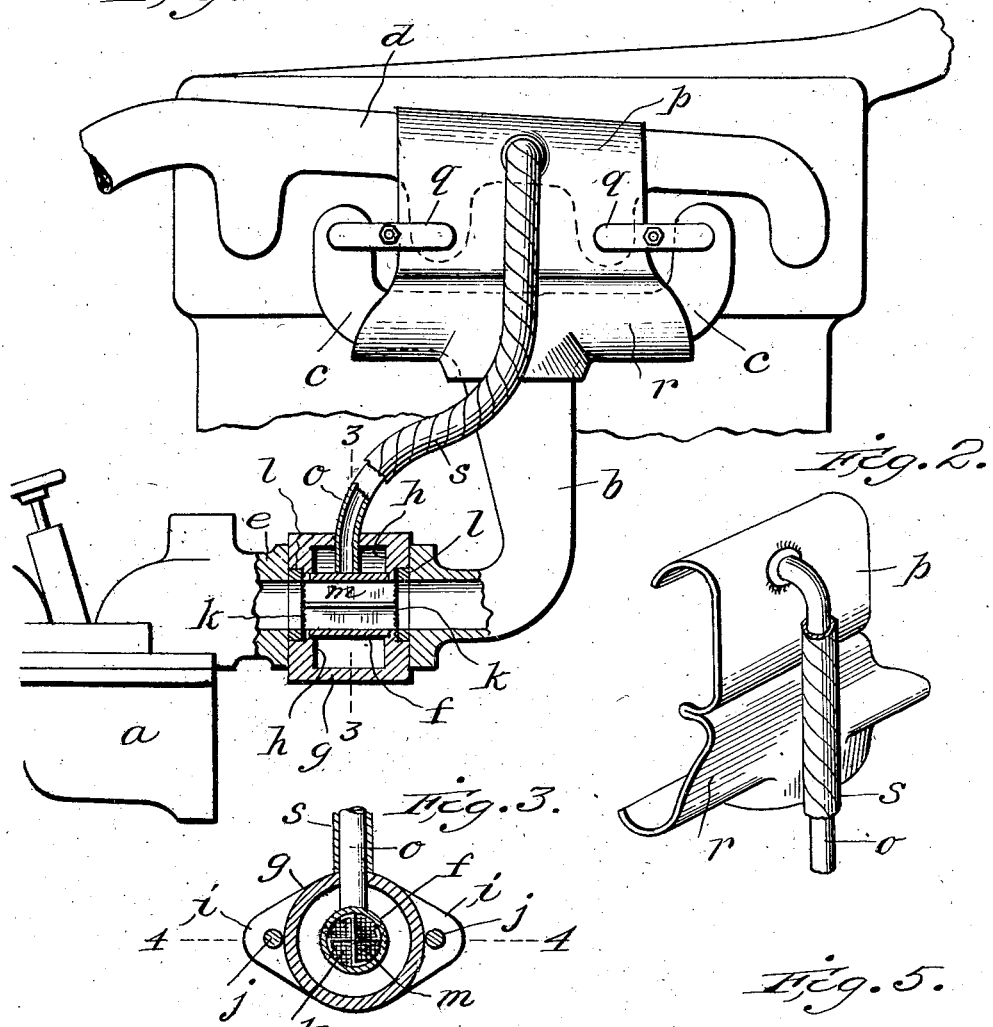

JOHN H. GORMAN, OF SALISBURY, NORTH CAROLINA, ASSIGNOR OF ONE-HALF TO HUGH P. BROWN, OF SALISBURY, NORTH CAROLINA.

FUEL-HEATER FOR GASOLENE-ENGINES.

1,274,707.  Specification of Letters Patent.  Patented Aug. 6, 1918.

Application filed January 4, 1918. Serial No. 210,296.

*To all whom it may concern:*

Be it known that I, JOHN H. GORMAN, a citizen of the United States of America, and a resident of Salisbury, county of Rowan, State of North Carolina, have invented certain new and useful Improvements in Fuel-Heaters for Gasolene-Engines, of which the following is a full and clear specification.

The object of this invention is to provide a simple attachment for gasolene engines which will utilize the waste heat of the exhaust to vaporize the fuel after it issues from the carbureter and before it enters the engine cylinders, to the end that a maximum of efficiency in all respects in the running of the engine may be obtained, as more fully hereinafter set forth.

In the drawing—

Figure 1 is a side elevation of so much of a gasolene engine of well-known type as is needed to illustrate my attachment;

Fig. 2 is a detail perspective view of the heat collector and storage device;

Fig. 3 is a vertical section on the line 3—3 of Fig. 1;

Fig. 4 is a vertical section on the line 4—4 of Fig. 3; and

Fig. 5 is a detail perspective view of a part of the gasifier.

In the drawing, $a$ designates a carbureter of the usual type, $b$ the usual intake manifold having the usual horizontal branches $c$, and $d$ the usual exhaust manifold of the engine.

Clamped between the outlet $e$ of the carbureter and the lower end of the intake manifold, is a vaporizer consisting of an inner cylinder $f$, an outer cylinder $g$ spaced away from the inner cylinder a sufficient distance to form an annular air chamber therebetween, and end walls $h$, these walls being extended laterally to form flanges $i$ which are secured, by bolts $j$, to the adjacent flanges of the carbureter and the intake manifold, respectively. The inner tube $f$ forms a continuation of the carbureter outlet and the intake inlet, so that the fuel mixture passes from the carbureter to the intake through this tube $f$. Clamped between the ends of the vaporizer cylinders and the respective ends of the parts $b$ and $e$ are gauze disks $k$ which are, for convenience, set in recesses in the ends of the gasifier and are clamped around their edges by suitable asbestos washers $l$, the washers being held in place by the clamping of the vaporizer in place against the ends of the carbureter outlet and the intake manifold. Fitted loosely and removably within the tube $f$ is a metal heating member consisting of a pair of crossed plates $m$ forming a spider, the longitudinal edges of the plates fitting against the interior of the tube $f$, these longitudinal edges being preferably provided with flanges $n$ which fit against the interior of the tube $f$ to maintain a broad, heat-conducting contact therewith.

Extending tightly through a hole in the outer cylinder $g$ is the lower end of a heat-conducting, metallic rod $o$ which may be solid or tubular, preferably tubular as shown. The end of this rod is shaped to fit hard against the exterior of the cylinder $f$. The upper end of the conductor $o$ has metallic connection with a metal plate $p$ which is of considerable area and is bent to fit down tightly over the upper surface of the exhaust manifold $d$, this plate being secured in place solidly against the manifold in any suitable manner, preferably by the clamps $q$ which are in use in a number of types of motor vehicles for securing the manifolds against the engine body. This plate $p$ has a depending extension $r$ which broadens out and is curved to closely hug the front and under sides of the horizontal member of the intake manifold, arching over and closely hugging the vertical member of this manifold.

The plate $p$ and its extension $r$ as well as the conductor $o$ are preferably made of copper by reason of the high degree of conductivity of that metal. The heat of the exhaust manifold is transmitted to the plate $p$ and is thence transmitted by the rod $o$ to the tube $f$, thereby heating said tube to a degree sufficient to vaporize the fuel passing therethrough. To break up the fuel particles as they pass through the tube $f$ and thus permit the heat to vaporize these particles, I provide the screens $k$, and, to insure a thorough vaporizing and homogenizing of the fuel, I provide the internal spider heater $m$, which is preferably made of a metal having a high conductivity, such as copper. To hold or store the heat in the vaporizer, I provide a dead-air space formed by the outer tube $g$ and the end walls $h$. The plate $p$ serves to gather the heat from the exhaust manifold and store it for transmission to the conductor o. It is essential that this plate have a considerable surface contact with the manifold and a considerable body or mass, in order to insure an ample and continuous supply of heat to the conductor; and, where the engine is used on motor vehicles (this being the principal purpose of my invention), the conductor o will be protected by a suitable covering s of asbestos or other non-conducting material to insure the delivery to the heating tube f of the vaporizer a maximum of heat units.

To adapt my device for use on various engines in which the positions of the carbureters differ with respect to the manifold, I prefer using a flexible conductor o to enable the same to be bent sufficiently to permit the proper location of the vaporizer; and it will be observed also that the vaporizer is so constructed that it may be readily inserted between the usual carbureter and the intake manifold, it being simply necessary to unbolt these parts and insert the vaporizer between the two parts, substituting a pair of long bolts for the short bolts that are removed. I have found through extensive experimentation that an ample supply of heat may be conducted in accordance with my invention to the vaporizer to insure the production of a practically dry fuel mixture for the engine, with the result that I have obtained in actual practice a large increase in power per unit of fuel as well as a material reduction in the expense and trouble of upkeep of the engine parts. In practice I have made the gathering and storing plate p as well as the conductor o of copper, and I have found that in but a very short period of time these metals are brought to a temperature which will heat the vaporizer to a sufficiently high degree to bring about vaporization of the passing fuel. I have found in practice also that I can gather sufficient heat by means of the broad plate p to utilize a part of the heat for heating the intake manifold and maintaining it at a sufficiently high temperature to insure the maintenance of the high temperature of the fuel mixture on its way through the intake manifold; I do this by extending the plate p to form the apron r which is shaped to have a broad and comparatively extensive contact with the intake manifold. I have also observed in my tests that the extraction of considerable heat from the exhaust manifold keeps the temperature of that manifold down to a desirable degree.

I have not as yet conducted any scientific tests to determine the approximate increase in the power I have been able to obtain per unit of fuel. I have, however, made many tests as to mileage and I have repeatedly found that with the same motor vehicle I have obtained from 40 to 75 per cent. increased mileage with my attachment. I have also tested my device in another way, namely, by observing the length of the flame of the waste fuel issuing from the exhaust manifold with my device on the engine and without it, and I have repeatedly demonstrated that with my device applied to the engine this flame of waste fuel is materially reduced in length and volume, thus indicating beyond doubt that with my device on the engine I secure a greater consumption of the fuel in the cylinders of the engine. A feature of very great importance in my device is that after it is once installed it needs no attention either in the running of the engine or at other times, since there are no pipes, chambers or valves to become clogged up.

It will be observed that the tube f is made quite thin; the object of this is to insure this tube heating up quickly, but it will be understood, of course, that the entire structure of the vaporizer will become considerably heated. A further advantage of the particular type of apparatus I have illustrated as embodying my invention lies in the fact that it may be attached to the engine without either dismantling the manifolds or boring holes in them; and it will be further understood that my appliance may be readily adapted for use on engines having air intakes of a construction differing greatly from the one illustrated in my drawing, it being simply essential, when the device embodies the intake-heating apron r, to see that this apron is shaped so as to closely hug a considerable area of the exposed intake tube or tubes.

It is obvious that various changes and modifications in details of construction may be made without departing from the scope of my invention.

The nature and scope of the invention having been thus indicated and its preferred embodiment having been specifically described, what is claimed as new is:

1. The combination with a gasolene engine of a metal heat-conductor, a metal heat-gathering and storing member held in close metallic contact with the exhaust manifold of the engine and having metallic contact with one end of said conductor, and a vaporizer appliance having metallic contact with the other end of said conductor and located between the carbureter and the intake of the engine.

2. The structure defined in claim 1, the heat-gathering member consisting of a plate clamped against the exhaust manifold and shaped to fit closely in contact therewith.

3. The structure defined in claim 1, the heat-gathering member being provided with an extension shaped to lie in close contact with the intake manifold of the engine.

4. The structure defined in claim 1, the vaporizer embodying an inner cylinder having metallic contact with the said conductor and also an outer cylinder forming a dead-air space around the inner cylinder.

5. The structure defined in claim 1, the vaporizer embodying an inner tube having metallic contact with said conductor and inclosing means for breaking up and atomizing the particles of fuel passing through the tube, said means embodying screens and a metallic heating member inclosed in the tube.

In testimony whereof I hereunto affix my signature.

JOHN H. GORMAN.